UNITED STATES PATENT OFFICE.

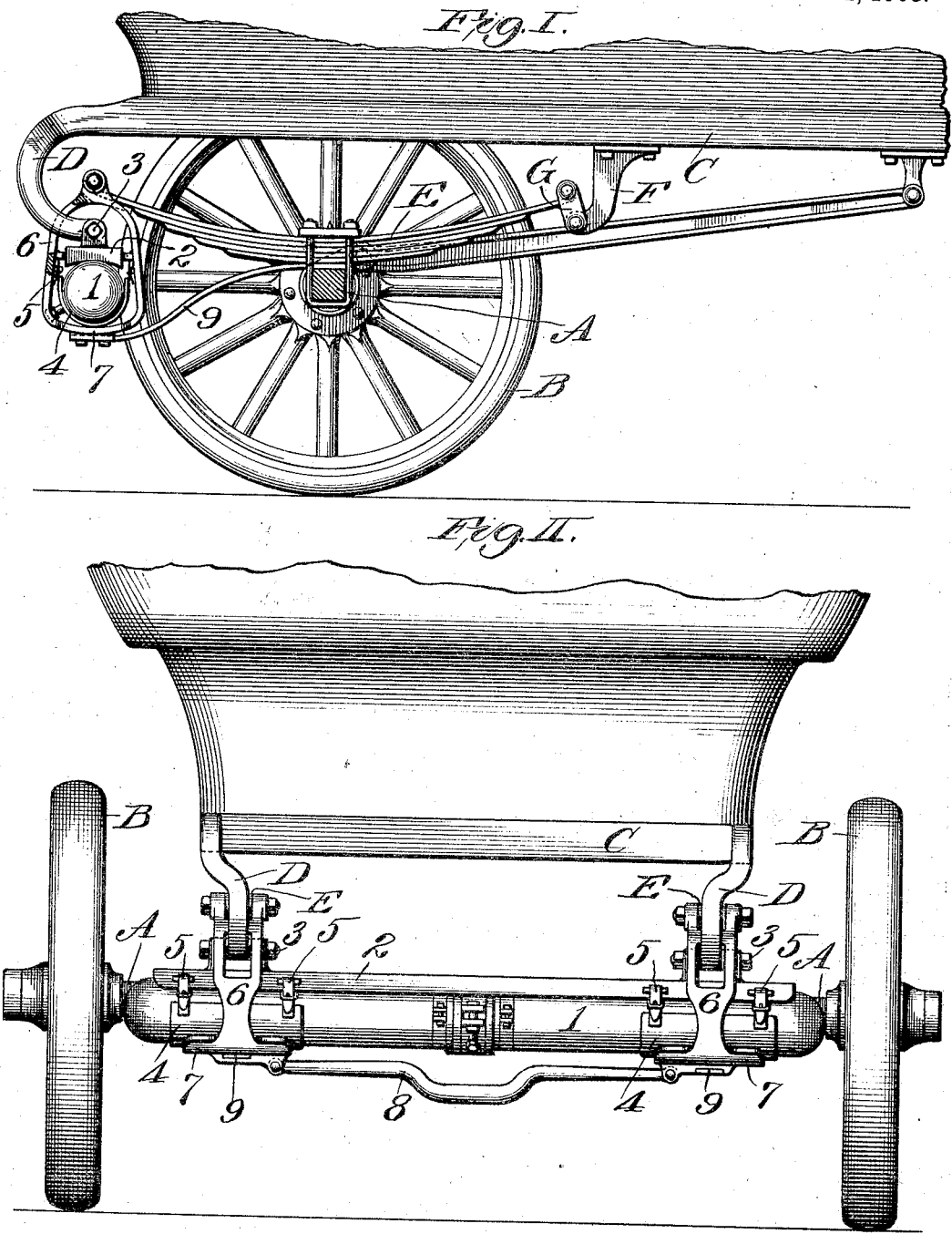

EDWARD A. GARVEY AND CHRISTOPHER A. GARVEY, OF ST. LOUIS, MISSOURI, ASSIGNORS TO THE AMERICAN AUTO APPLIANCE COMPANY.

SHOCK-ABSORBER FOR VEHICLES.

No. 923,162.   Specification of Letters Patent.   Patented June 1, 1909.

Application filed January 9, 1908. Serial No. 409,927.

*To all whom it may concern:*

Be it known that we, EDWARD A. GARVEY and CHRISTOPHER A. GARVEY, both citizens of the United States of America, residing at the city of St. Louis, in the State of Missouri, have invented certain new and useful Improvements in Shock-Absorbers for Vehicles, of which the following is a full, clear, and exact description, reference being had to the accompanying drawing, forming part of this specification.

Our invention relates to a cushion device for vehicles, whereby the shocks to which the vehicles are subjected are absorbed, and the present invention has for its object, the construction of efficient means whereby a pneumatic cushion may be supported by the body frame of the vehicle and be brought into action by means carried by the running gear of the vehicle.

Figure I is a view partly in side elevation and partly in longitudinal section of a portion of a vehicle in which our shock absorber is incorporated. Fig. II is a rear elevation of the vehicle shown in Fig. I.

In the accompanying drawings: A designates an axle of a vehicle B ground wheels fitted to said axle, and C a vehicle body frame located above the axle A. The frame C is preferably provided at an end thereof with curved arms D that have utility to be hereinafter mentioned.

E are leaf springs mounted upon the axle A and having arms extending both inwardly and outwardly from said axle. The inner arms of the spring are loosely connected to the vehicle body frame C by suitable means such as rearwardly curved brackets F and upwardly extending links G.

1 designates a pneumatic cushion preferably of bolster shape, and preferably of a length corresponding to the width of the vehicle body frame C or of a length greater than the width of said frame.

2 is a suspended carrier that is united to the body frame C in a suitable manner and preferably through the medium of bolts 3 that connect said carrier to the arms D of the frame. The pneumatic cushion 1 is located beneath the carrier 2 and is supported beneath the carrier by bearers 4, preferably of a contour corresponding to a segment of the pneumatic cushion and connected to the carrier by suitable means such as straps 5. It will be seen that the construction just described, provides for the pneumatic cushion being carried by the vehicle body frame C, so that it will partake of any movement partaken by said body frame.

6 designates stirrups that are connected to the outer arms of the vehicle springs E, and which are provided with shoes 7, located beneath the pneumatic cushion 1. The bearers 4 in which the pneumatic cushion rests are adapted to seat upon the shoes 7 of the stirrups 6, and said bearers therefore serve not only as means for holding the cushion to the carrier 2, but also as means for relieving the cushion from wear at the points thereof immediately above said shoes. The shoes 7 are united by a bridge bar 8 which serves to hold said shoes from lateral movement independently of each other.

9 are resilient retaining straps that connect the lower ends of the stirrups 6 to the running gear of the vehicle and serve to limit the possible swaying motion of said stirrups.

In the use of a vehicle equipped with our shock absorber, the force of a blow upon a ground wheel of the vehicle is transmitted from the wheel to the vehicle axle to which the wheel is fitted, therefrom to the springs E and the stirrups 6. The shoes 7 of said stirrups then, serving as impact members, transmit the force of the blow to the pneumatic cushion 1 and said pneumatic cushion serves as an intermediary relief member to minimize the transmission of the force of the blow to the vehicle body frame C. It is to be noted that the pneumatic cushion herein described is supported aside from the axles of the running gear of the vehicle and outwardly relative to said axles and that therefore the body frame of the vehicle may be located as closely to the ground as is consistent with the running gear proper, thereby making it possible to efficiently maintain the equilibrium of the vehicle body frame and body of the vehicle having incorporated therein our shock absorbing device.

We claim:

1. The combination, with a running gear, and a body frame; of stirrups supported by the running gear, a carrier suspended from the body frame within the stirrups, bearers suspended from the carrier, and an elongated cushion mounted upon the bearers against the carrier.

2. The combination, with a running gear, and a body frame; of stirrups having shoes and supported by the running gear, a carrier suspended from the body frame within the stirrups, bearers suspended from the carrier, and an elongated cushion mounted upon the bearers against the carrier.

3. The combination with a vehicle running gear and a vehicle body-frame having arms and surmounting said running gear; of a carrier supported by said arms, an elongated pneumatic cushion, located beneath said carrier, a pair of bearers attached to said carrier and supporting said elongated cushion and a pair of stirrups surrounding said bearers, said carrier, and said elongated cushion, substantially as set forth.

4. The combination with a vehicle running gear and a vehicle body frame having arms and surmounting said running gear; of a carrier supported by said arms, an elongated pneumatic cushion located beneath said carrier, a pair of bearers attached to said carrier and supporting said elongated cushion, and a pair of stirrups having supporting shoes and surrounding said bearers, said carrier, and said elongated cushion.

EDWARD A. GARVEY.
CHRISTOPHER A. GARVEY.

In the presence of—
BLANCHE HOGAN,
LILY ROST.